UNITED STATES PATENT OFFICE.

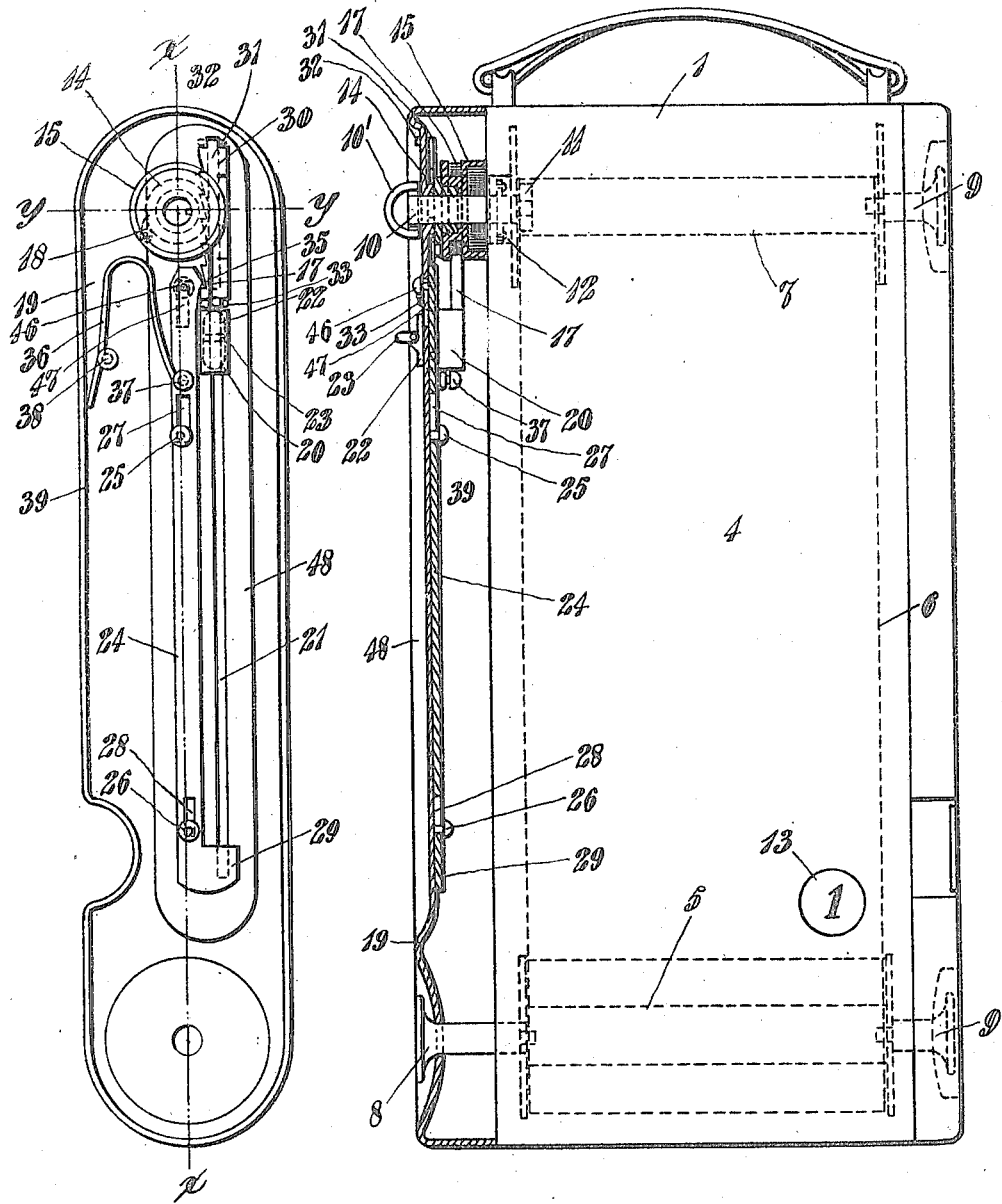

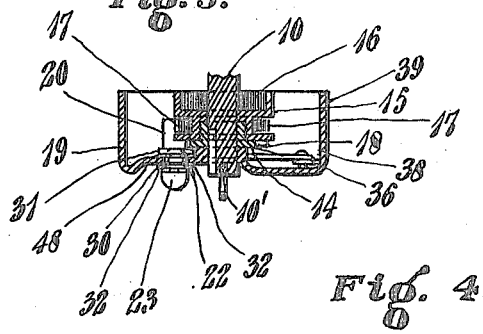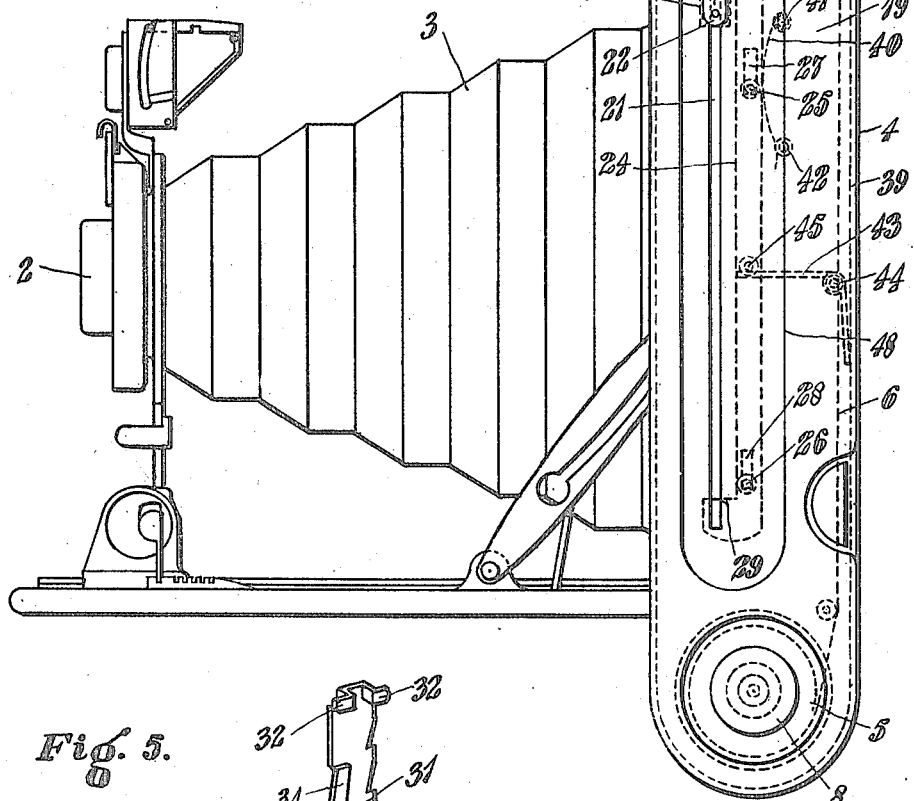

HARNEY I. WILLIAMS, OF CINCINNATI, OHIO.

CAMERA.

1,208,066. Specification of Letters Patent. Patented Dec. 12, 1916.

Application filed May 6, 1915. Serial No. 26,347.

*To all whom it may concern:*

Be it known that I, HARNEY I. WILLIAMS, a citizen of the United States, and a resident of Cincinnati, in the county of Hamilton and State of Ohio, have invented certain new and useful Improvements in Cameras, of which the following is a specification.

My invention relates to cameras, and more especially to cameras in which a flexible film is used; and its object is to quickly and accurately shift the film to expose successive portions thereof.

My invention consists in the combination of parts and in the details of construction and arrangement of parts as will herein be more fully described and claimed.

In the drawings: Figure 1 is a front view of a camera embodying my invention, the main part of the camera being shown in elevation and in closed position, and the film-shifting device embodying my improvement on said camera being shown in vertical section on the line x—x of Fig. 2; Fig. 2 is an inside view of the film-shifting device removed from the body of the camera; Fig. 3 is a horizontal cross section on the line y—y of Fig. 2; Fig. 4 is a side elevation of the camera in open position and showing the outside of the film-shifting device slightly modified from the example of the preceding figures; and Fig. 5 is a perspective detail of the elongated stop.

The camera which I have chosen for illustrating my invention comprises the body 1 with the lens 2 and bellows 3 properly mounted for folding inside of the body, as is well known in connection with this kind of camera; and the body has a removable back 4 which, when removed, allows the insertion of a reel 5 containing the film 6 which is to be drawn up across the exposure space in the back of the body 1 opposite the lens 2 and wound onto a rewinding reel 7 in the top of the body 1, which is also made removable. The removable mounting of the lower reel 5 consists of studs 8 and 9 which are slidable lengthwise away from the reel or toward and in engagement with the reel in a well-known manner, being so formed as to allow the reel to turn freely. The mounting of the upper reel 7 is similar in having a stud 9 on which the reel may turn freely, but at the other side is a stud 10 which is slidable inward and outward, and on its inner end carries a chucking member 11 to engage with the reel 7 and cause the reel to turn with the stud 10. This stud 10 has a handle 10' on the outside of the camera for manually turning it to wind the film onto this upper reel 7, and is also provided with a friction ratchet 12 which permits the reel 7, to be freely turned in the direction to wind the film on the reel 7, but prevents any turning of the reel 7 in the other direction, these provisions being found in these cameras as usually constructed.

Ordinarily, with the usual arrangement as so far described, the reel 7, constituting the shifting means for the film is turned by means of the handle 10' and stud 10 until the number of the next film section appears in the aperture 13 in the removable back 4 near the bottom of the camera. However, this method of shifting the film is, on many occasions, found so slow as to cause inconvenience and even to preclude the taking of pictures in as rapid succession as may be desirable or be required under certain circumstances. Acordingly, some means for shifting the film to expose the next section by a single simple movement is highly desirable. To do this in conjunction with the rotation of the reel 7 requires, in addition to manipulating means for rotating the reel through a simple single movement, a modifying means for modifying the normally varying action of this shifting means, i. e., compensating for the accumulation due to the winding of the film on this reel, in such a manner that it will be unnecessary to watch the aperture 13, or in any other manner give special attention to gaging the amount of feed of the film each time. I provide a suitable manipulating means by fixing upon the stud 10 a ratchet wheel 14 some distance out from the friction ratchet 12, and mounting between this ratchet wheel 14 and the friction ratchet 12 a drum 15. Inside of the drum 15, adjacent to the friction ratchet 12, is coiled a flat spring 16, having one end fixed to the inner wall of the drum 15, and the other end fixed to the stud 10 in such a manner that this spring 16 will allow the drum to be rotated on the stud rather freely in one direction by the application of some outside force, but will rotate this drum backward again upon cessation of application of the outside force. This drum 15, over next to the ratchet 14, has a rather deep groove in which is wound a tape 17 in such direction that this unwinding opposes rotation which is imparted by the spring 16, one end of this tape being fixed to the drum 15. The ratchet wheel 14 has a hub that extends inside this part of the drum under its groove, thus allowing of a more compact arrangement of these parts. This part of the drum 15 adjacent to the ratchet wheel 14 is of diameter somewhat greater than that of the ratchet wheel, and carries a pawl 18 that engages with the teeth of the ratchet wheel, said teeth, and the pawl, and said tape 17 and spring 16, being so arranged that turning of the drum 15 by unwinding of the tape 17 turns the stud 10 and the engaged reel 7 in a direction to wind the film 6 on the reel 7. It will be seen that, by means of the spring 16, the pawl 18 and attached parts make up a manipulating means for the shifting means or reel 7 that is automatically adjustable thereto. These parts above described, thus mounted on the stud 10, immediate to and co-axial with the reel 7, are inclosed by a casing 19 that is mounted on the side of the camera body 1 with the stud 10 projecting through its outer side, whereby an additional bearing is formed for this stud 10. As here shown, the stud 10 is not provided with the handle 10' above mentioned, outside this casing. With my improved shifting means, such a manipulating means will not be needed, but, it will be understood that the stud may be provided with such a means in conjunction with my improvement for thus shifting the film where it might be desired. The casing 19 extends from the top to the bottom of the side of the camera body 1, and it will be understood that this casing may form part of the side of the body of the camera and be made to conform with the other parts of said body and be covered with leather or other suitable material as are the other outside parts of the camera body.

The end of the tape 17 that is unwound from the drum 15 is fixed to a block 20 that has an extension through a slot 21, running up and down longitudinally of the outer side of the casing 19, and mounted on the part of the extension that extends through the slot 21 is a finger piece comprising a base 22 fixed to said extension and a lug 23 hinged on the base 22 in such a manner that it will swing upward and inward toward the base, but will not swing downward on said base. With this manipulating means, the finger of the operator may be engaged with the finger piece, pulling down on the block 20 along the slot 21 and unwinding the tape 17, directly connected to the drum 15, that is coaxial with the reel 7, affords ample power for giving the above described rotation to the reel 7 and shifting the film 6, which sometimes binds at the sides on the reel 7, with considerable resistance. The slot 21 is made amply long to allow a sufficient stroke for shifting the film 6 the full distance required each time.

The modifying means will now be described. Alongside of the slot 21, on the inner wall of the outer side of the casing 19, is mounted a bar 24 by means of pins 25 and 26 extending through slots 27 and 28 in said bar 24, said pins being fixed in the casing 19 up near the upper end of the slot 21 and down near the lower end thereof, respectively. These pins 25 and 26 have heads engaging with the bar 24 to hold it upon the pins. The lower slot 28 is of width sufficient only to allow the lower pin 26 to pass therethrough, and the lower end of the bar has a foot 29 that extends across the lower end part of the slot 21 at such a point that when the bar 24 descends and the upper end of its slot 28 engages with the lower pin 26 this foot 29 will be in the proper position to form a stop for the block 20 at the lower end of the stroke of said block. Above the upper end of the slot 21, and in vertical alinement therewith, is another shorter slot 30. An elongated adjustable stop 31 stands vertically, and has, at its upper end, an extension through this slot 21 with lateral lugs 32 bearing against the outside of the casing along the sides of the slot 21. The lower end of said stop 31 has a similar extension through the upper part of the slot 21, with lateral lugs 33 bearing against the outer side of the casing along the sides of this slot 21. On the side opposite from the bar 24, this stop 21 has tongues 34 bent down from its edge near its middle and bearing tightly against the inner wall of the casing 19, so that there is considerable friction between the parts of the stop 31 and the casing where they make contact. On the other side, the stop 31 has a series of ratchet teeth pitched upwardly, and the upper end of the bar 24 has a nose 35 that engages with any one of these ratchet teeth. The upper slot 27 of the bar 24 is somewhat wider than the thickness of the pin 25, so that the bar 24 may swing over away from the stop 31 far enough to allow the nose 35 to pass up over any of the teeth of the stop 31. As shown in Figs. 1 and 2, a spring 36 is provided for yieldably holding the bar 24 over toward the stop 31, and also for yieldably holding the bar 24 up with the lower end of its lower slot 28 engaged with the lower pin 26. This spring for this purpose comprises an upper inverted U-shaped part with one end engaged around a pin 37 on the bar 24 just above the upper slot 27; and the other side of the U-shaped part passes down to a pin 38 in the inner side of the casing 19 and has an extension around this pin and over against the back wall 39 of the casing 19. Thus, the spreading tendency of the U-shaped part tends to force the bar 24 against the stop 31, while downward movement of the bar 24 is resisted by the resiliency of the entire spring.

In the modification shown in Fig. 4, a flat spring 40 is fixed to an upper pin 41 and has its lower end bearing against a lower pin 42 in the inner wall of the casing 19 and has its middle bowed forwardly and bearing against the back of the bar 24, thus yieldably holding the bar forward. In this modification, a separate spring 43 is wrapped around a pin 44 near the back wall 39 of the casing, and has a forwardly extending part engaging under a pin 45 in the bar 24, and a downwardly extending part engaging against the back wall 39, thus yieldably holding the bar up. The first described construction is simpler, but the latter construction has the advantage of employing a weaker spring for holding the bar forward than is employed for holding the bar upward, as may be desired under some circumstances.

When the foregoing construction is understood, it will be seen that the block 20, on its upward stroke, will be stopped by engagement with the lower end of the elongated stop 31 which occupies the upper end of the slot 21 in which said block slides up and down. It is during this upward stroke of the block 20 under the action of the coiled flat spring 16 in the drum 15 that the pawl 18 is drawn back around the ratchet wheel 14 on the stud 10 preparatory to feeding a new section of the film 6 at the next downward stroke of the block 20. Therefore, the distance to which the block 20 returns upward will determine the distance which the pawl 18 travels around said ratchet wheel 14, and this will determine the extent of feeding of the next section of film. Since the diameter of the upper roll on the upper reel 7 grows larger after each successive feeding, it will be seen that the degree of rotation of this upper reel should be less each time in order to provide the feeding of a uniform length of film each time; although this variation will amount to only a fraction of a revolution.

Thus constructed, when the block 20 is pushed downward, it strikes the foot 29 of the bar 24 which, under the action of the spring 36 or of the spring 43, is held upward. Then, the operator continuing to push down on the block 20, the bar 24 is pulled downward against the action of the spring 36 or spring 43, and the nose 35 of the bar, engaging with a tooth on the adjustable stop 31, will pull this adjustable stop downward the distance that the bar 24 moves until the upper end of its slot 28 strikes the pin 26, whereupon the limit of downward movement, both of the bar 24 and of the block 20 is reached, this also marking the limit of upward movement of the film 6. Then the block 20, being allowed to be pulled up along the slot 21 again under the action of the flat coil spring 16, drum 15 and tape 17, the block 20 will be stopped upon engagement with the lower end of the stop 31, which, due to the above described action, is now one tooth lower than it was before. Therefore, the pawl 18 will have traveled a proportionately less distance back around the ratchet wheel 14, and the next downward movement of the block 20 will impart a proportionately less degree of turning to the upper reel 7. With the parts properly proportioned, the above described modifying means will so govern the turning of the upper reel 7 each time that the accumulation due to the winding of the reel 7 will be compensated for, and uniform exposure lengths of the film will be unwound and rewound at each full downward stroke of the block 20. The number of teeth in the intermittently-advanced stop 31 will be according to the number of exposures the film 6 is provided for. In the example shown, the mechanism is constructed to make six exposures. It will be understood that more or less exposures may be provided for by varying the number of teeth and the dimensions of the various parts accordingly.

After all of the exposures provided for have been made, it is necessary to release the stop 31 to allow it to travel to its highest position again. For this purpose the bar 24 has a pin 46 extending through a slot 47 in the outer side of the casing 19, said slot 47 being long enough to allow the required up and down motion of the bar 24, and wide enough to allow it to be pulled back out of engagement with the teeth of the stop 31. Thus, the finger may be engaged with the outer end of this pin 46, pulling the bar 24 upward, whereupon the constant pull of the coiled flat spring 16 in the drum 15 will act through the drum 15, the tape 17 and block 20, to pull the stop 31 up to its highest position immediately and automatically.

Preferably the outer side of the casing 19 has an elongated depression 48 in which the slot 21 is located, bringing the finger piece far enough in so that when its lug 23 is swung upward there will be no projection of the finger piece such as will be accidentally engaged in handling the camera, thus insuring against accidental shifting of the film. In operating the device, the only special attention required on the part of the operator is to the sliding of the block 20 to the full extent of its stroke, until it is stopped by the upper end of the slot 28 striking the pin 26. However, should this full stroke not be made, this will not, if noticed, have serious consequences. In such an event, it will only be necessary for the operator to turn the upper reel 7 by means of the handle 10' in the ordinary manner of shifting the film, watching the aperture 13 until the next number appears. Then the exposure may be made, and, for the next shifting, my improved shifting device will operate properly.

It will be understood that if the stud 10 is provided with a handle, this handle may be hinged thereon to swing down in the depression 48, which depression is continued up around the stud 10; this arrangement of the handle of the stud being well known in cameras as heretofore constructed. The outer end of the releasing pin 46 also lies within this depression 48, so that accidental manipulation of this part is also insured against. The depression 48 is preferably made wide enough to form a flat bearing for the bar 24 and stop 31 on the interior of the casing as shown. The increased frictional engagement of the stop 31 with the side of the casing is found in practice to so retard the movement of the stop 31 that it is under the full control of the bar 24 at all times during the operation. It will be seen that the stop 31 is held down by the nose 35 of the bar 24 long before the block 20 reaches the upper end of its stroke. Therefore, when the stop 31 is to stop this block 20, it is held positively in the correct position to provide the compensation as above described.

In using the camera with my improvement thereon, the body of the camera is held by the two hands, with the thumb of one hand engaging the finger piece and pointing downward, while the other hand holds the shutter-operating device at the other side of the camera; and with this mechanism thus provided the shifting of the film is rendered fully as simple and almost as quick as is the manipulation of the shutter-operating mechanism. The numbers of the films will be exposed through the aperture 13 as usual, and these numbers may be consulted to determine what film is being exposed, but it will be unnecessary to inspect these to know that the film has been brought to the proper position. Thus, the camera may be held in picture-taking position, and a plurality of exposures may be made in rapid succession with assurance that all will be properly located upon the film. Then, when the full capacity of the film has been exhausted and a new film is to be inserted, it is only necessary to press forwardly on the releasing pin 46 to set the film-feeding device ready for feeding the next film.

My improved device is capable of being made very thin and compact, even more so than is indicated in the drawings, wherein the parts of the film-shifting device are somewhat exaggerated in thickness as well as in lateral spacing, for the sake of clearness. Furthermore, all of the manipulating parts, extraneous of the spindle 10 and its drum and ratchet, are movable substantially in straight lines, eliminating gear wheels or other wheels as well as levers and other elements requiring pivots. Thus, the device operates very easily and the wear is minimized; which advantages, together with the simplicity of construction, insure ample durability and freedom from derangement, being in these respects fully equal to the other mechanism of cameras as they are usually constructed.

My improved film-shifting device is not limited in its application to cameras of the kind herein illustrated, but may be applied in modified forms to various other cameras having flexible films. It is especially desirable when embodied in such cameras as the "Graflex" camera, for use in taking pictures of rapidly changing scenes; as when used by newspaper and magazine photographers, naturalists, and others, who are thus able to secure views of quickly succeeding scenes which they would not be able to secure if under the necessity of turning the camera over and slowly manipulating the ordinary film-shifting means before making a succeeding exposure.

From the foregoing description it will be understood that my invention is susceptible of considerable modification to adapt it to different conditions met with, and therefore I do not wish to be understood as being limited to the exact details illustrated and described herein, but

What I claim as new and desire to secure by Letters Patent is:

1. In a camera, in combination with a film and normally varyingly-acting shifting means acting directly on said film for shifting it, means immediate and automatically adjustable to said shifting means for intermittently operating said shifting means to successively shift said film, and variably-stopped manipulating means, directly connected to said immediate means, whereby repeated movement of said manipulating means repeatedly operates said shifting means to shift said film to an equal extent at each successive operation.

2. In a camera, in combination with a film and normally varyingly-acting rotatable shifting means acting directly on said film for shifting it, means coaxial with and automatically adjustable to said shifting means for intermittently rotating said shifting means to successively shift said film, and variably-stopped manipulating means, directly connected to said coaxial means, whereby repeated movement of said manipulating means repeatedly rotates said shifting means to shift said film to an equal extent at each successive rotation.

3. In a camera, in combination with a film and normally varyingly-acting rotatable shifting means acting directly on said film for shifting it, means coaxial with and automatically adjustable to said shifting means for intermittently rotating said shifting means to successively shift said film, variably-stopped manipulating means, and flexible operative connection from this means direct to said coaxial means, whereby repeated movement of said manipulating means repeatedly rotates said shifting means to shift said film to an equal extent at each successive rotation.

4. In a camera, in combination with a film and normally varyingly - acting rotatable shifting means acting directly on said film for shifting it, means coaxial with and automatically adjustable to said shifting means for intermittently rotating said shifting means to successively shift said film, variably-stopped manipulating means movable in a single general direction, and flexible operative connection from this means direct to said coaxial means, whereby repeated movement of said manipulating means repeatedly rotates said shifting means to shift said film to an equal extent at each successive operation.

5. In a camera, in combination with a film and normally varyingly - acting shifting means for successively shifting said film, guided manipulating means for said shifting means, and modifying means, guided substantially in the direction of guiding of the manipulating means, to successively vary the degree of operation of said shifting means, to shift said film to an equal extent at each successive operation.

6. In a camera, in combination with a film and normally varyingly - acting shifting means for successively shifting said film, guided manipulating means for said shifting means, and a ratchet-controlled adjustable stop for said manipulating means, guided substantially in the direction of guiding of the manipulating means, to successively vary the degree of operation of said shifting means, to shift said film to an equal extent at each successive operation.

7. In a camera, in combination with a film and normally varyingly - acting shifting means to successively shift said film, modifying means to successively vary the degree of operation of said shifting means to shift said film to an equal extent at each successive operation, and automatically adjustable means to restore said modifying means to its initial relation to said shifting means, whereby said shifting means is restored to its initial degree of operation.

8. In a camera, in combination with a film and normally varyingly - acting shifting means to successively shift said film, an intermittently-advanced releasable stop to successively vary the degree of operation of said shifting means to shift said film to an equal extent at each successive operation, and automatically adjustable means adapted to restore said stop to its initial relation to said shifting means, whereby said shifting means is restored to its initial degree of operation, when said stop is released.

9. In a camera, in combination with a film and normally varyingly - acting shifting means to successively shift said film, manipulating means for said shifting means, automatically adjustable in one direction, and an intermittently-advanced releasable stop to successively vary the degree of operation of said shifting means to shift said film to an equal extent at each successive operation, said automatically adjustable manipulating means being adapted to restore itself and said stop to their initial relation to said shifting means, whereby said shifting means is restored to its initial degree of operation, when said stop is released.

10. In a camera, in combination with a film and normally varyingly-acting directly shifting means acting on said film for shifting it, manipulating means automatically adjustable to said shifting means for intermittently operating said shifting means to successively shift said film, and an intermittently-advanced releasable stop for said manipulating means whereby said manipulating means has movements of successively varying degree to successively vary the degree of operation of said shifting means to shift said film to an equal extent at each successive operation, said automatically adjustable manipulating means being adapted to restore itself and said stop to their initial relation to said shifting means, whereby said shifting means is restored to its initial degree of operation, when said stop is released.

11. In a camera, in combination with a film and normally varying-acting shifting means acting on said film for shifting it, guided manipulating means automatically adjustable to said shifting means for intermittently operating said rotatable shifting means to successively shift said film, and an intermittently-advanced releasable stop, guided substantially in the direction of guiding of the manipulating means, whereby said manipulating means has movements of successively varying degree to successively vary the degree of operation of said shifting means to shift said film to an equal extent at each successive operation, said automatically adjustable manipulating means being adapted to restore itself and said stop to their initial relation to said shifting means, whereby said shifting means is restored to its initial degree of operation, when said stop is released.

12. In a camera, in combination with a film and normally varyingly-acting rotatable shifting means acting directly on said film for shifting it, means coaxial with and automatically adjustable to said shifting means for intermittently rotating said shifting means to successively shift said film, manipulating means directly connected to said coaxial means, and an intermittently-advanced releasable stop for said manipulating means whereby said manipulating means has movements of successively varying degree to successively vary the degree of rotation of said shifting means to shift said film to an equal extent at each successive rotation, said automatically adjustable means being adapted to restore said manipulating means and said stop to their initial relation to said shifting means, whereby said shifting means is restored to its initial degree of operation, when said stop is released.

13. In a camera, in combination with a film and normally varyingly-acting rotatable shifting means acting directly on said film for shifting it, means coaxial with and automatically adjustable to said shifting means for intermittently rotating said shifting means to successively shift said film, guided manipulating means directly connected to said coaxial means, and an intermittently-advanced releasable stop guided substantially in the direction of guiding of the manipulating means, whereby said manipulating means has movements of successively varying degree to successively vary the degree of rotation of said shifting means to shift said film to an equal extent at each successive rotation, said automatically adjustable means being adapted to restore said manipulating means and said stop to their initial relation to said shifting means, whereby said shifting means is restored to its initial degree of operation, when said stop is released.

14. In a camera, in combination with a film, and normally varyingly-acting shifting means for successively shifting said film, substantially rectilinearly-guided manipulating means for said shifting means, and a substantially rectilinearly-guided ratchet-controlled stop for said manipulating means to successively vary the degree of operation of said shifting means to shift said film to an equal extent at each successive operation.

15. In a camera, in combination with a film, and normally varyingly-acting shifting means for successively shifting said film, substantially rectilinearly-guided manipulating means for said shifting means, a substantially rectilinearly-guided ratchet-controlled stop for said manipulating means to successively vary the degree of operation of said shifting means to shift said film to an equal extent at each successive operation, and disengageable means to release said stop and to restore said shifting means to its initial degree of operation.

16. In a camera, in combination with a film, and a reel on which the film is to be wound, substantially rectilinearly-guided manipulating means for said reel, and a substantially rectilinearly-guided ratchet-controlled stop for said manipulating means to successively vary the degree of rotation of said reel to compensate for accumulation due to the winding of said film on said reel.

17. In a camera, in combination with a film, and a reel on which the film is to be wound, substantially rectilinearly-guided manipulating means for said reel, a substantially rectilinearly-guided ratchet-controlled stop for said manipulating means to successively vary the degree of rotation of said reel to compensate for accumulation due to the winding of said film on said reel, and disengageable means to release said stop and to restore said reel to its initial degree of rotation.

18. In a camera, in combination with a film, and a reel on which the film is to be wound, substantially rectilinearly guided manipulating means, operative connection from this means to said reel, whereby repeated movement of said manipulating means repeatedly rotates said reel to wind said film thereon, stops for said manipulating means at opposite ends of and movable along its line of movement, and means whereby the stop at one end, upon engagement by said manipulating means, moves the stop at the other end, to successively diminish the degree of rotation of said reel to compensate for accumulation due to the winding of said film on said reel.

19. In a camera, in combination with a film, and a reel on which the film is to be wound, substantially rectilinearly guided manipulating means, operative connection from this means to said reel, whereby repeated movement of said manipulating means repeatedly rotates said reel to wind said film thereon, stops for said manipulating means at opposite ends of and movable along its line of movement, and means whereby the stop at one end, upon engagement by said manipulating means, moves the stop at the other end, to successively diminish the degree of rotation of said reel to compensate for accumulation due to the winding of said film on said reel, and disengageable means to release said stop and to restore said manipulating means to its initial greatest degree of movement.

20. In a camera, in combination with a film, and a reel upon which said film is to be wound, a casing, manipulating means inclosed in said casing, automatically adjustable operative connection from said manipulating means to said reel, said casing having an elongated slot in its side, and said manipulating means having a projection through said slot and being movable along said slot to rotate said reel and wind said film upon said reel, stops for said manipulating means at opposite ends of said slot, each of said stops being movable in the general direction of the line of movement of the manipulating means, and means whereby the stop at one end of said slot, upon engagement by said manipulating means, moves the stop at the other end of the slot to diminish the degree of each successive movement of said manipulating means and, through said automatically adjustable operative connection, diminsh the degree of each successive rotation of said reel to compensate for the accumulation due to the winding of said film on said reel.

21. In a camera, in combination with a film, and a reel upon which said film is to be wound, a casing, manipulating means inclosed in said casing, automatically adjustable operative connection from said manipulating means to said reel, said casing having an elongated slot in its side, and said manipulating means having a projection through said slot, and being movable along said slot to rotate said reel and wind said film upon said reel, stops for said manipulating means at opposite ends of said slot, each of said stops being movable, and means whereby the stop at one end of said slot, upon engagement by said manipulating means, moves the stop at the other end of the slot to diminish the degree of each successive movement of said manipulating means, and, through said automatically adjustable operative connection, diminish the degree of each successive rotation of said reel to compensate for the accumulation due to the winding of said film on said reel, and means to release one of said stops from the other and allow the latter stop to return to its initial position to provide the initial greatest movement of said manipulating means.

22. In a camera, in combination with a casing, a film, and a reel on which the film is to be wound, manipulating means having a substantially rectilinear path, operative connection from this means to said reel, whereby repeated movement of said manipulating means repeatedly rotates said reel to wind said film thereon, a stop mounted to slide in and along said path near one end thereof, and having ratchet teeth thereon pitched away from the adjacent end of said path, retarding means for said stop, a bar guided alongside said path and yieldably held against said ratchet teeth, a projection on said bar across said path some distance inwardly from its other end, said bar being adapted to slide over said teeth in the direction in which they are pitched, but to engage with said teeth and pull said stop inwardly along said path when said manipulating means engages with the projection, whereby said stop is moved inwardly along said path by said manipulating means at one end of each movement of said manipulating means, and diminishes the distance which said manipulating means may move at the other end of each movement of said manipulating means.

23. In a camera, in combination with a film, and a reel upon which said film is to be wound, a casing, manipulating means inclosed in said casing, automatically adjustable operative connection from said manipulating means to said reel, said casing having an elongated slot in its side, and said manipulating means having a projection through said slot and being movable along said slot to rotate said reel and wind said film upon said reel, a stop at one end of said slot mounted to slide in along the slot, ratchet teeth on said stop pitched away from said slot, retarding means for said stop, a bar extending alongside said slot, guiding and stopping means for said bar, means on said bar projecting across said slot some distance inwardly from the other end of said slot, yieldable means supporting said bar against said ratchet teeth, means on said bar to slide over said teeth away from the adjacent end of said slot, but to engage with said teeth and pull said stop inwardly along said slot when said manipulating means engages with the means projecting across the slot near the other end, whereby said stop is moved inwardly along said slot by said manipulative means at one end of each of its movements, and limits the distance which said manipulative means may move at the other end of each of its movements, thereby, through said adjustable operative connection, diminishing in degree each successive rotation of said reel, to compensate for the accumulation due to the winding of said film on said reel.

24. In a camera, in combination with a film, and a reel upon which said film is to be wound, a casing, manipulating means inclosed in said casing, automatically adjustable operative connection from said manipulating means to said reel, said casing having an elongated slot in its side, and said manipulating means having a projection through said slot and being movable along said slot to rotate said reel and wind said film upon said reel, a stop at one end of said slot mounted to slide in along the slot, ratchet teeth on said stop pitched away from said slot, retarding means for said stop, a bar extending alongside said slot, guiding and stopping means for said bar, means on said bar projecting across said slot some distance inwardly from the other end of said slot, yieldable means supporting said bar against said ratchet teeth, on said bar to slide over said teeth away from the adjacent end of said slot, but to engage with said teeth and pull said stop inwardly along said slot when said manipulating means engages with the means projecting across the slot near the other end, whereby said stop is moved inwardly along said slot by said manipulative means at one end of each of its movements, and limits the distance which said manipulative means may move at the other end of each of its movements, thereby, through said adjustable operative connection, diminishing in degree each successive rotation of said reel, to compensate for the accumulation due to the winding of said film on said reel, said means having another slot in its side, and a projection on said bar out through this slot to move said bar away from said ratchet teeth and permit said stop to return to its initial position and thus permit the initial greatest degree of movement of said manipulating means.

25. In a camera, in combination with a film, and a reel on which said film is to be wound, a stud making engagement with said reel to rotate it, a ratchet engaging with said stud to permit rotation of the reel to wind the film thereon but to prevent rotation of the reel for unwinding of the film therefrom, a drum rotatable on said stud, a coil spring around said stud having one end fixed to said stud and the other end fixed to said drum to rotate said drum in direction opposite to that of the winding rotation of said reel, a ratchet wheel fixed on said stud alongside said drum, a pawl mounted on said drum and engaging with said ratchet wheel to rotate said reel in winding direction and means to rotate said drum in winding direction, said coil spring returning said drum and returning said pawl around said ratchet upon release of said drum-rotating means preparatory to a succeeding film-winding rotation of said drum.

26. In a camera, in combination with a film, and a reel on which said film is to be wound, a stud making engagement with said reel to rotate it, a ratchet engaging with said stud to permit rotation of the reel to wind the film thereon but to prevent rotation of the reel for unwinding of the film therefrom, a drum rotatable on said stud, a coil spring around said stud having one end fixed to said stud and the other end fixed to said drum to rotate said drum in direction opposite to that of the winding rotation of said reel, a ratchet wheel fixed on said stud alongside said drum, a pawl mounted on said drum and engaging with said ratchet wheel to rotate said reel in winding direction, and means to rotate said drum in winding direction, said coil spring returning said drum and returning said pawl around said ratchet upon release of said drum-rotating means preparatory to a succeeding film-winding rotation of said drum, and means for diminishing the extent of return of said pawl around said ratchet wheel after each successive film-winding rotation of said reel.

27. In a camera, in combination with a film, and a reel on which said film is to be wound, a stud making engagement with said reel to rotate it, a ratchet engaging with said stud to permit rotation of the reel to wind the film thereon but to prevent rotation of the reel for unwinding of the film therefrom, a drum rotatable on said stud, a coil spring around said stud having one end fixed to said stud and the other end fixed to said drum to rotate said drum in direction opposite to that of the winding rotation of said reel, a ratchet wheel fixed on said stud alongside said drum, a pawl mounted on said drum and engaging with said ratchet wheel to rotate said reel in winding direction and means to rotate said drum in winding direction, said coil spring returning said drum and returning said pawl around said ratchet upon release of said drum-rotating means preparatory to a succeeding film-winding rotation of said drum, means for diminishing the extent of return of said pawl around said ratchet wheel after each successive film-winding rotation of said reel, and means for restoring the initial greatest degree of return of said pawl.

28. In a camera, in combination with a film, and a reel on which said film is to be wound, a stud making engagement with said reel to rotate it, a ratchet engaging with said stud to permit rotation of the reel to wind the film thereon but to prevent rotation of the reel for unwinding of the film therefrom, a drum rotatable on said stud, a coil spring around said stud having one end fixed to said stud and the other end fixed to said drum to ratate said drum in direction opposite to that of the winding rotation of said reel, a ratchet wheel fixed on said stud alongside said drum, a pawl mounted on said drum and engaging with said ratchet wheel to rotate said reel in winding direction, flexible means fixed to and wound on said drum, whereby in unwinding it rotates said drum in film-winding direction, manipulating means connected to said flexible means, a casing mounted on said camera and inclosing said drum, said ratchet wheel, said flexible means, and said manipulating means, and having an elongated slot in its side, said manipulating means having a projection through said slot and being movable along said slot in one direction to unwind said flexible means and impart the film-winding rotation to said reel, and to be drawn in the other direction along said slot through the action of said coil spring.

29. In a camera, in combination with a film, and a reel on which said film is to be wound, a stud making engagement with said reel to rotate it, a ratchet engaging with said stud to permit rotation of the reel to wind the film thereon but to prevent rotation of the reel for unwinding of the film therefrom, a drum rotatable on said stud, a coil spring around said stud having one end fixed to said stud and the other end fixed to said drum to rotate said drum in direction opposite to that of the winding rotation of said reel, a ratchet wheel fixed on said stud alongside said drum, a pawl mounted on said drum and engaging with said ratchet wheel to rotate said reel in winding direction, flexible means fixed to and wound on said drum, whereby in unwinding it rotates said drum in film-winding direction, manipulating means connected to said flexible means, a casing mounted on said camera and inclosing said drum, said ratchet wheel, said flexible means, and said manipulating means, and having an elongated slot in its side, said manipulating means having a projection through said slot and being movable along said slot in one direction to unwind said flexible means and impart the film-winding rotation to said reel, and to be drawn in the other direction along said slot through the action of said coil spring, stops for said manipulating means at opposite ends of said slot, each of said stops being movable, and means whereby the stop at one end of said slot, upon engagement by said manipulating means, moves the stop at the other end of the slot to diminish the degree of each successive movement of said manipulating means.

HARNEY I. WILLIAMS.

Witnesses:
   JAMES N. RAMSEY,
   CLARENCE PERDEW.